(12) United States Patent
Mahvan et al.

(10) Patent No.: US 6,258,468 B1
(45) Date of Patent: Jul. 10, 2001

(54) AMR READ SENSOR STRUCTURE AND METHOD WITH HIGH MAGNETORESISTIVE COEFFICIENT

(75) Inventors: Nader Mahvan, Cupertino; Sukesh Mahajan; Raman J. Basi, both of Fremont, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/218,984

(22) Filed: Dec. 22, 1998

(51) Int. Cl.$^7$ ........................................ G11B 5/39
(52) U.S. Cl. .................. 428/679; 360/127; 427/131; 428/680; 428/681
(58) Field of Search .................... 428/615, 623, 428/621, 678, 679, 680, 681, 686, 622; 360/126; 427/131

(56) References Cited

U.S. PATENT DOCUMENTS 5,731,936   3/1998   Lee et al. ........................ 360/113

Primary Examiner—Francis J. Lorin

(74) Attorney, Agent, or Firm—Robert D. Hayden

(57) ABSTRACT

A magnetic read element for use in magnetic data retrieval includes a NiFeCr seed layer and an electrically insulating spacer layer between an MR stripe and a soft adjacent layer formed of, for example, NiFeRh. The magnetic read element includes a magnetoresistive stripe and a seed layer formed of NiFeCr that is interfacially adjacent the magnetoresistive stripe. The read element also includes a spacer layer adjacent the seed layer, with the seed layer being disposed between the magnetoresistive stripe and the spacer layer. The spacer layer is formed of an electrically insulating material. In addition, a soft adjacent layer is included in the read element, adjacent the seed layer and formed of a low-coercivity, high-permeability magnetic material. The spacer layer can be formed of Ta, while the soft adjacent layer can be formed of NiFeRh. The magnetic read element can be incorporated in a read/write head, and further incorporated in a read/write system for data retrieval. A method of the present invention includes providing a substrate, forming a soft adjacent layer of low-coercivity, high-permeability material above the substrate, forming a spacer layer of electrically insulating material above the soft adjacent layer, forming a seed layer of NiFeCr above the spacer layer, and forming a magnetoresistive stripe above and interfacially adjacent the seed layer.

24 Claims, 6 Drawing Sheets

AMR READ SENSOR STRUCTURE AND METHOD WITH HIGH MAGNETORESISTIVE COEFFICIENT

BACKGROUND OF THE INVENTION

This invention relates generally to magnetic disk data storage systems, and more particularly to AMR read sensors for use in conjunction with magnetic data storage media.

Magnetic disk drives are used to store and retrieve data for digital electronic apparatus such as computers. In FIGS. 1A and 1B, a magnetic disk data storage systems 10 of the prior art includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end to the arm 20, and at its other end to a read/write head or transducer 24. The transducer 24 typically includes an inductive write element with a sensor read element (which will be described in greater detail with reference to FIG. 2). As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Alternatively, some transducers, known as "contact heads," ride on the disk surface. Various magnetic "tracks" of information can be read from the magnetic disk 16 as the actuator 18 causes the transducer 24 to pivot in a short arc as indicated by the arrows P. The design and manufacture of magnetic disk data storage systems is well known to those skilled in the art.

FIG. 2 depicts a magnetic read/write head 24 including a write element 26 and a read element 28. The edges of the write element 26 and read element 28 also define an air bearing surface ABS, in a plane 29, which faces the surface of the magnetic disk 16 shown in FIGS. 1A and 1B.

The write element 26 is typically an inductive write element. A write gap 30 is formed between an intermediate layer 31, which functions as a first pole, and a second pole 32. Also included in write element 26, is a conductive coil 33 that is positioned within a dielectric medium 34. As is well known to those skilled in the art, these elements operate to magnetically write data on a magnetic medium such as a magnetic disk 16.

The read element 28 includes a first shield 36, the intermediate layer 31, which functions as a second shield, and a read sensor 40 that is located between the first shield 36 and the second shield 31, and suspended within a dielectric layer 37. The most common type of read sensor 40 used in the read/write head 24 is the magnetoresistive sensor. A magnetoresistive (MR) sensor is used to detect magnetic field signals by means of a changing resistance in the read sensor. When there is relative motion between the MR sensor and a magnetic medium (such as a disk surface), a magnetic field from the medium can cause a change in the direction of magnetization in the read sensor, thereby causing a corresponding change in resistance of the read element. The change in resistance can be detected to recover the recorded data on the magnetic medium.

One type of conventional MR sensor utilizes the anisotropic magnetoresistive (AMR) effect for such detection, including a soft adjacent layer (SAL) 42, a spacer layer 44, and MR stripe 46, and a cap layer 48, as shown in FIG. 3. The resistance of the MR stripe 46 varies in proportion to the square of the cosine of the angle between the magnetization in the MR stripe and the direction of a sense current flowing through the MR stripe. Because the magnetization of the MR stripe 46 can be affected when it is exposed to an external field, a detected change in resistance can be used to detect an external field.

More particularly, when the read sensor magnetization is properly biased, for example by transverse biasing, the change in resistance $\Delta R$ is proportional to small external fields. Such transverse bias can be provided by a bias layer, or soft adjacent layer (SAL) 42, disposed near the MR stripe 46. Materials such as cobalt (Co) based alloys and nickel-iron (NiFe) alloys, for example nickel-iron-rhodium (NiFeRh), can be used as the SAL 42. However, to prevent exchange coupling and electrical shunting of the sensing current by the SAL 42, a nonmagnetic, electrically insulating film, or spacer layer 44, is interposed between the SAL 42 and the MR stripe 46. The spacer layer 44 should, accordingly, have high resistivity, as well as substantially zero magnetic moment (i.e., be non-magnetic). Also, the better the thermal stability of the spacer layer 44, the larger the maximum sensing current can be. In addition, a cap layer 48 can be included to protect the MR stripe 46 from oxidation that might degrade the sensor performance.

A performance parameter of such an MR sensor is the ratio of change in resistance, $\Delta R$, to the read sensor sheet resistance, R. This ratio, $\Delta R/R$, is sometimes referred to as the MR coefficient of the read sensor, with higher values indicating higher performance. Higher $\Delta R/R$ can be achieved with thicker layers, however higher data density applications require thinner layers. As an alternative, $\Delta R/R$ can be increased by heating the MR stripe 46 during fabrication, however, $\Delta R/R$ is not increased if reactive layers are interfacially adjacent the MR stripe 46. Further, such heating can damage other layers, such as the shields 31 and 36. Therefore, instead of heating, $\Delta R/R$ can be increased by forming the MR stripe on certain materials that are used as a seed layer.

Such a material that yields higher $\Delta R/R$ when the MR stripe is formed on it, is tantalum (Ta). Also, because of its high resistivity, good thermal stability, and non-magnetic properties, tantalum (Ta) has been used for the spacer layer 44, as shown in the read sensor 40 of FIG. 3.

It has been proposed to use NiFeCr as a seed layer and spacer 52 between an MR stripe 46 and a SAL 42 in place of tantalum, as shown in the read sensor 50 of FIG. 4 to achieve greater performance. However, it has been found that when a material such as NiFeRh is used for the SAL 42, such a structure exhibits an undesirably low $\Delta R/R$. In particular, a NiFeRh/NiFeCr/MR read sensor exhibits a $\Delta R/R$ on the order of less than 1.3%.

Thus, what is desired is an improved read sensor that results in a higher $\Delta R/R$, and therefore higher read performance, while minimizing sensing current shunting, and maximizing the allowable sensing current level.

SUMMARY OF THE INVENTION

The present invention provides a read sensor, and method for making the same, that exhibits a higher $\Delta R/R$ and, therefore, increased read performance. This is accomplished by a read sensor structure that includes a NiFeCr seed layer and an electrically insulating spacer layer between an MR stripe and a soft adjacent layer formed of, for example, NiFeRh.

According to an embodiment of the present invention, a magnetic read element for use in magnetic data retrieval includes a magnetoresistive stripe and a seed layer formed of NiFeCr that is interfacially adjacent the magnetoresistive stripe. The read element also includes a spacer layer adjacent the seed layer, with the seed layer being disposed between the magnetoresistive stripe and the spacer layer. The spacer layer is formed of an electrically insulating material. In addition, a soft adjacent layer is included in the read element, adjacent the seed layer and formed of a low-coercivity, high-permeability magnetic material.

In another embodiment of the present invention, a magnetic device for reading data from a magnetic medium includes a first shield, a second shield disposed above the first shield, and a magnetic read sensor disposed between the first shield and the second shield. The magnetic read sensor includes a magnetoresistive stripe and a seed layer formed of NiFeCr that is interfacially adjacent the magnetoresistive stripe. The read element also includes a spacer layer interfacially adjacent the seed layer, with the seed layer being disposed between the magnetoresistive stripe and the spacer layer. The spacer layer is formed of an electrically insulating material. In addition, a soft adjacent layer is included in the read element, interfacially adjacent the seed layer and formed of a low-coercivity, high-permeability magnetic material.

In yet another embodiment of the present invention, a method for forming a magnetic read sensor includes providing a substrate and forming a soft adjacent layer of low-coercivity, high-permeability material above the substrate. The method also includes forming a spacer layer of electrically insulating material above the soft adjacent layer and forming a seed layer of NiFeCr above the spacer layer. Further, the method includes forming a magnetoresistive stripe above and interfacially adjacent the seed layer.

In still yet another embodiment of the present invention, a method for forming a magnetic read sensor includes providing a substrate and forming a seed layer of NiFeCr above the substrate. Additionally, the method includes forming a magnetoresistive stripe above and interfacially adjacent the seed layer. The method further includes forming a spacer layer of electrically insulating material above the magnetoresistive stripe, and forming a soft adjacent layer of low-coercivity, high permeability material above the spacer layer.

With a read sensor according to the above structures and methods, higher read performance can be achieved than with other structures, such as structures without the spacer layer between the seed layer and the soft adjacent layer. This higher performance results in significantly greater precision and reliability than with other structures, without increasing fabrication complexity.

These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, wherein like reference numerals designate like elements.

DETAILED DESCRIPTION OF THE PREFERRED EMBODIMENTS

FIGS. 1–4 were discussed with reference to the prior art.

Figure 1A:
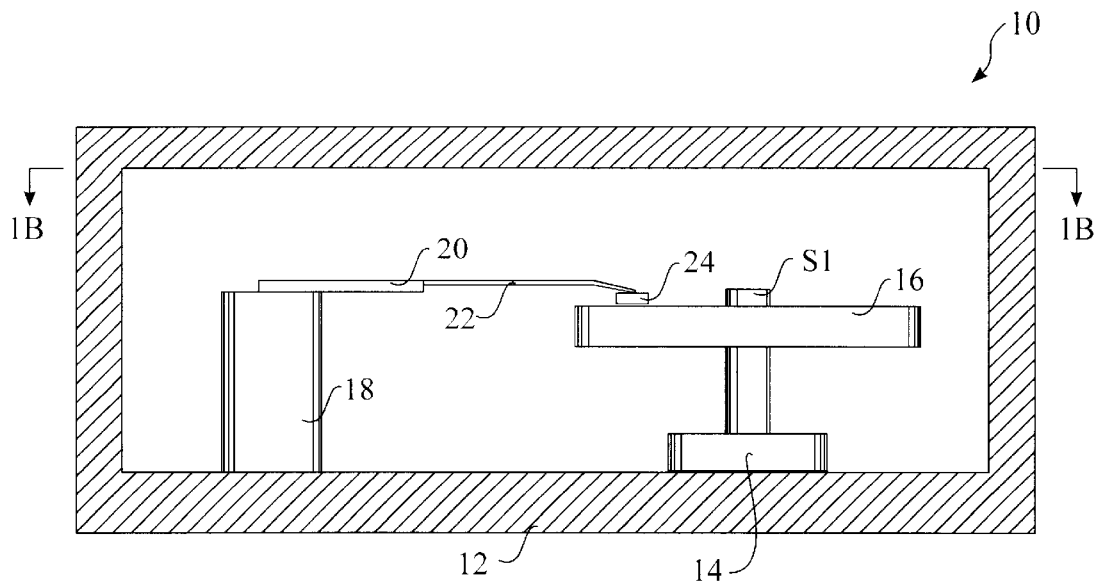
FIG. 1A is a partial cross-sectional front elevation view of a magnetic data storage system.
Figure 1B:
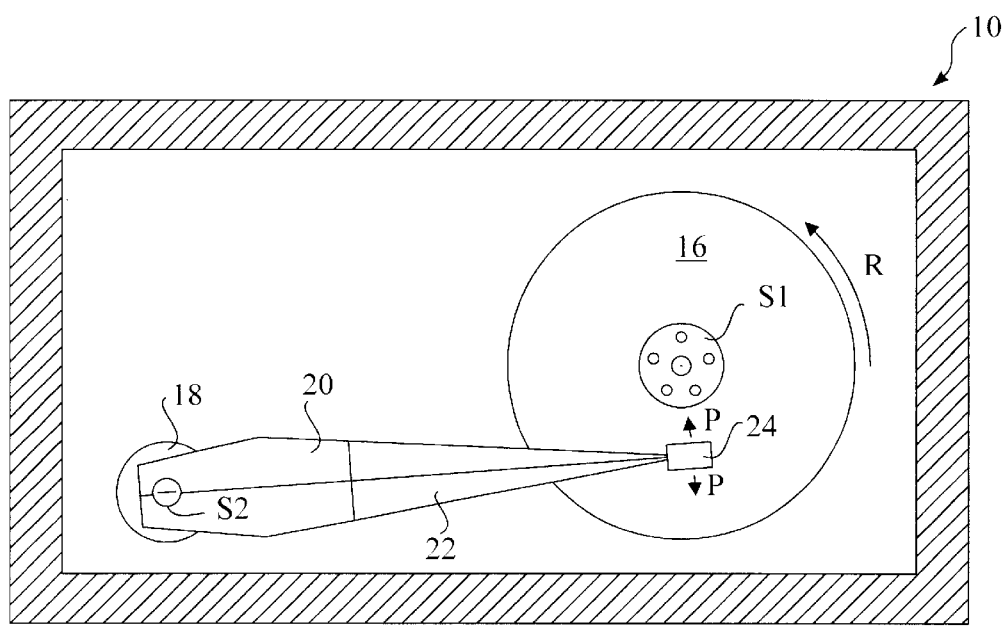
FIG. 1B is a top plan view of the magnetic data storage system, along line 1B—1B of FIG. 1A.
Figure 2:
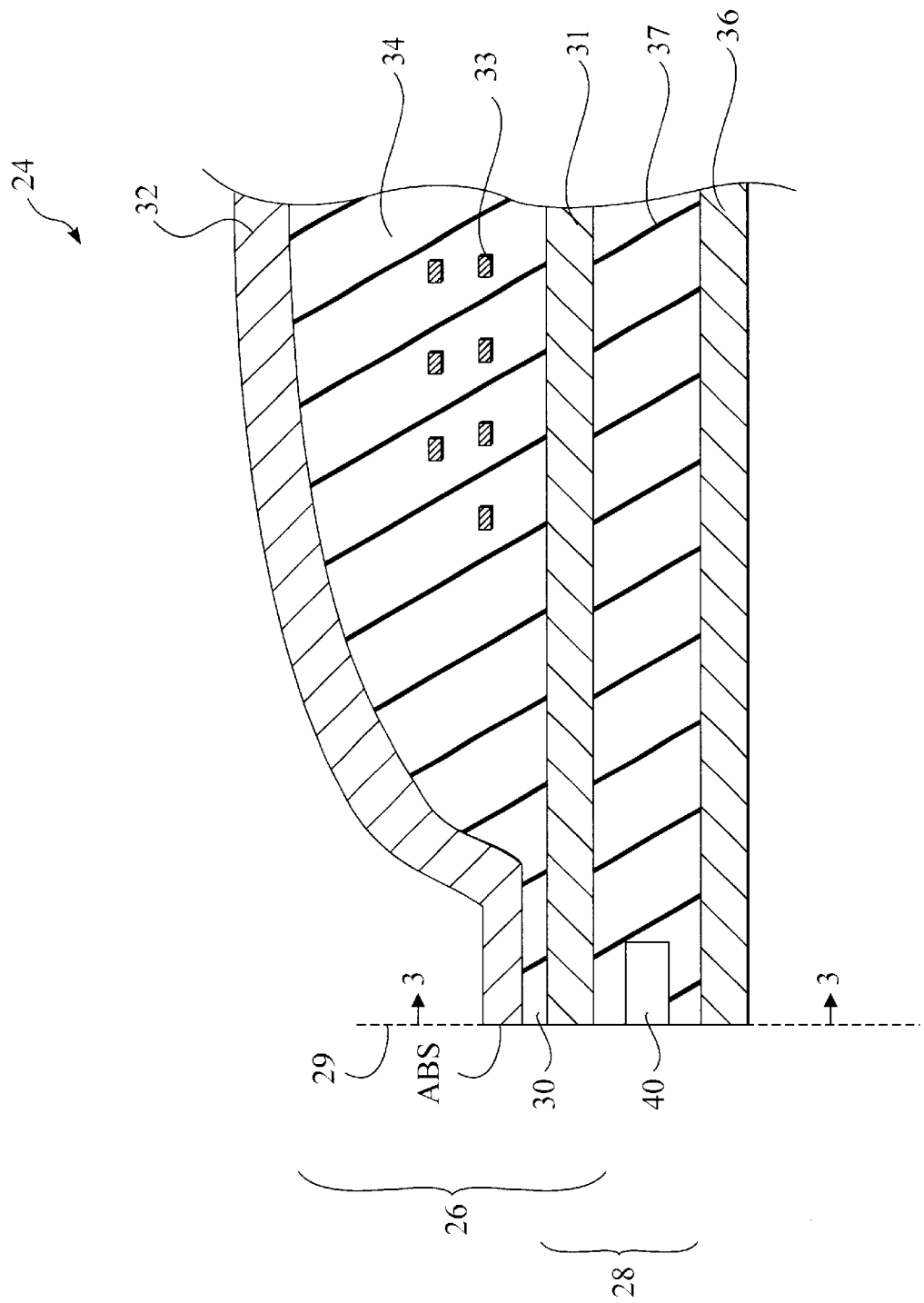
FIG. 2 is a cross-sectional view of a read/write head of the magnetic disk drive assembly of FIGS. 1A and 1B.
Figure 3:
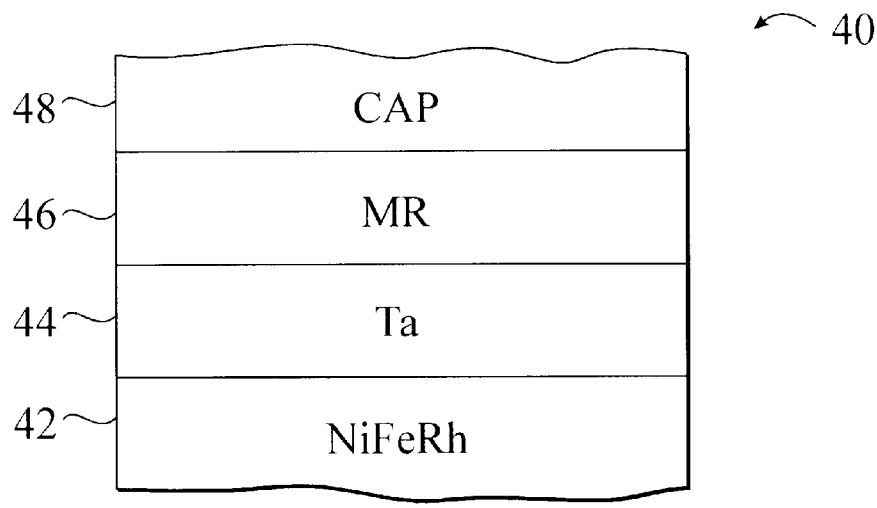
FIG. 3 is a partial end view taken along line 3—3 of FIG. 2, of a prior art read sensor of the read/write head of FIG. 2.
Figure 4:
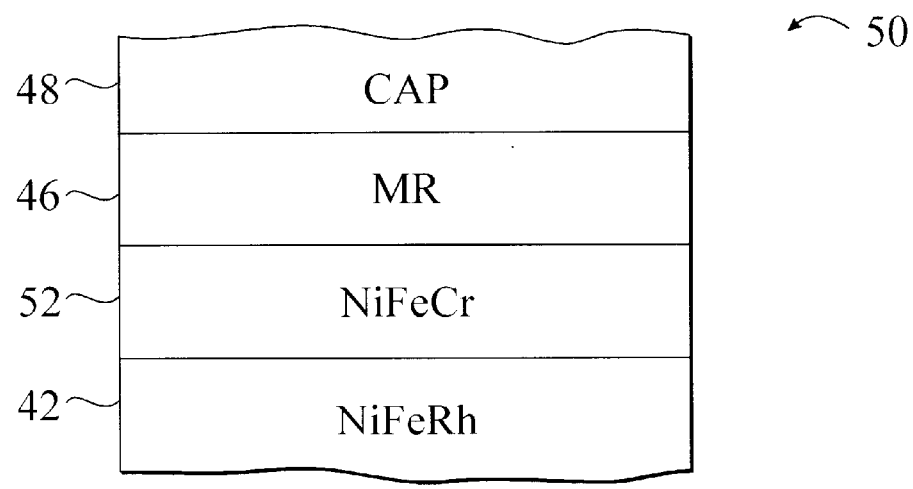
FIG. 4 is a partial end view taken along line 3—3 of FIG. 2, of another prior art read sensor of the read/write head of FIG. 2.
Figure 5:
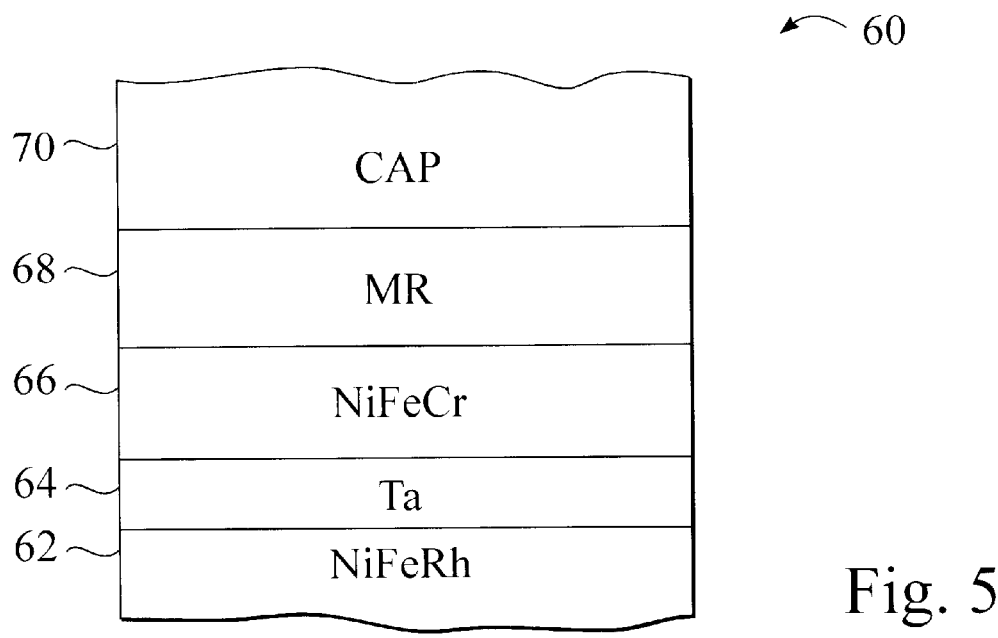
FIG. 5 is a partial end view of a read sensor according to an embodiment of the present invention.

FIG. 5 depicts an end view of a read sensor 60, according to an embodiment of the present invention. The read sensor 60 includes a soft adjacent layer SAL 62 formed of, for example, a nickel-iron alloy such as nickel-iron-rhodium (NiFeRh). Other low-coercivity, high-permeability magnetic materials can also be used to form the SAL 62, for example a cobalt alloy, such as cobalt-niobium-titanium (CoNbTi). Above the SAL 62, a spacer layer 64 is formed of an electrically insulating material. For example, the spacer layer 64 can be formed of tantalum (Ta) or tantalum alloys. The spacer layer 64 should have a thickness of at least about 3 angstroms, with a thickness in the range of about 20 to about 35 angstroms working well. Above the spacer layer is disposed a seed layer 66 formed of nickel-iron-chromium (NiFeCr). The seed layer 66 can have a thickness in the range of about 15 angstroms to about 45 angstroms. To provide a sensing layer, a magnetoresistive (MR) stripe 68 is formed above and interfacially adjacent the seed layer 66. Thus, the seed layer 66 also operates, in conjunction with the spacer layer 64, as a spacer between the SAL 62 and the MR stripe 68. A cap layer 70 can also be included in read sensor 60 above the MR stripe 68 to prevent oxidation of the MR stripe 68.

With the addition of a spacer layer 64 between the SAL 62 and a seed layer 66 formed of NiFeCr, the MR stripe 68 exhibits a significantly greater $\Delta R/R$. For example, it has been found that with a read sensor structure such as that shown in FIG. 3, a $\Delta R/R$ of about 1.3 to about 1.4% is achieved, and with the read sensor structure in FIG. 4 a $\Delta R/R$ of less than about 1.3% is achieved. In contrast, the read sensor 60 depicted in FIG. 5 exhibits a $\Delta R/R$ of over about 2%.

Figure 6:
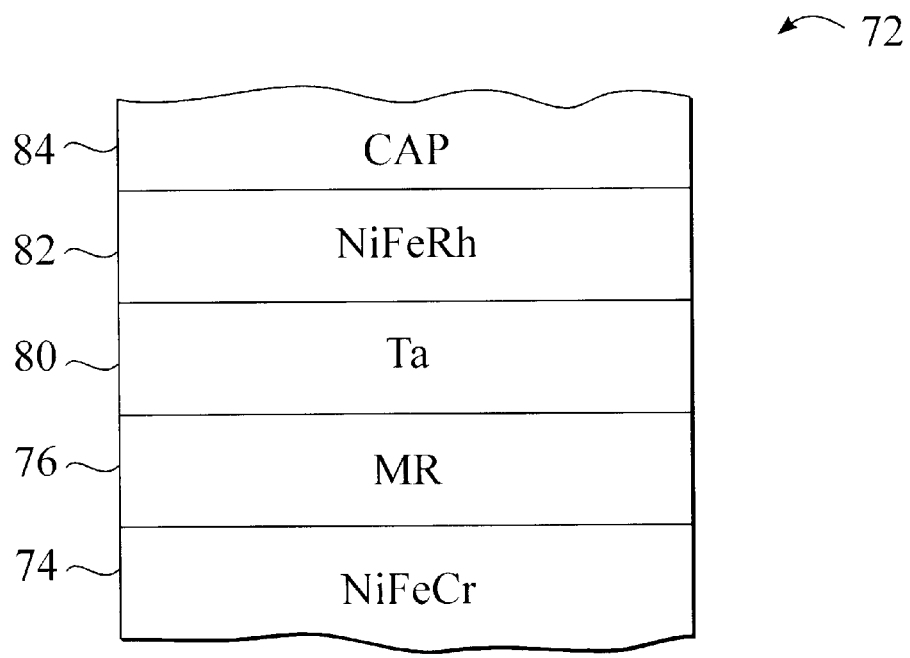
FIG. 6 is a partial end view of a read sensor according to another embodiment of the present invention.

Another embodiment of the present invention is a read sensor 72 as show in FIG. 6. Read sensor 72 includes a seed layer 74 formed of NiFeCr, upon which an MR stripe 76 is formed. The seed layer 74 can have a thickness in the range of about 15 angstroms to about 45 angstroms. Above the MR stripe 76, a second spacer layer 80 is disposed. The spacer layer 80 is formed of an electrically insulating material, such as tantalum or tantalum alloys. To provide transverse biasing, a soft adjacent layer (SAL) 82 is included in the read sensor 72 above the spacer layer 80. Additionally, a cap layer 84 can be included above the SAL 82.

With this structure, the seed layer 74 provides a seed layer for the MR stripe 76, while the spacer layer 80 provides a spacer between the MR stripe 76 and SAL 82. Here again, similar to a sensor with the structure depicted in FIG. 5, the read sensor can achieve significantly greater $\Delta R/R$ by using a NiFeCr seed layer that is not adjacent a NiFeRh SAL.

Figure 7:
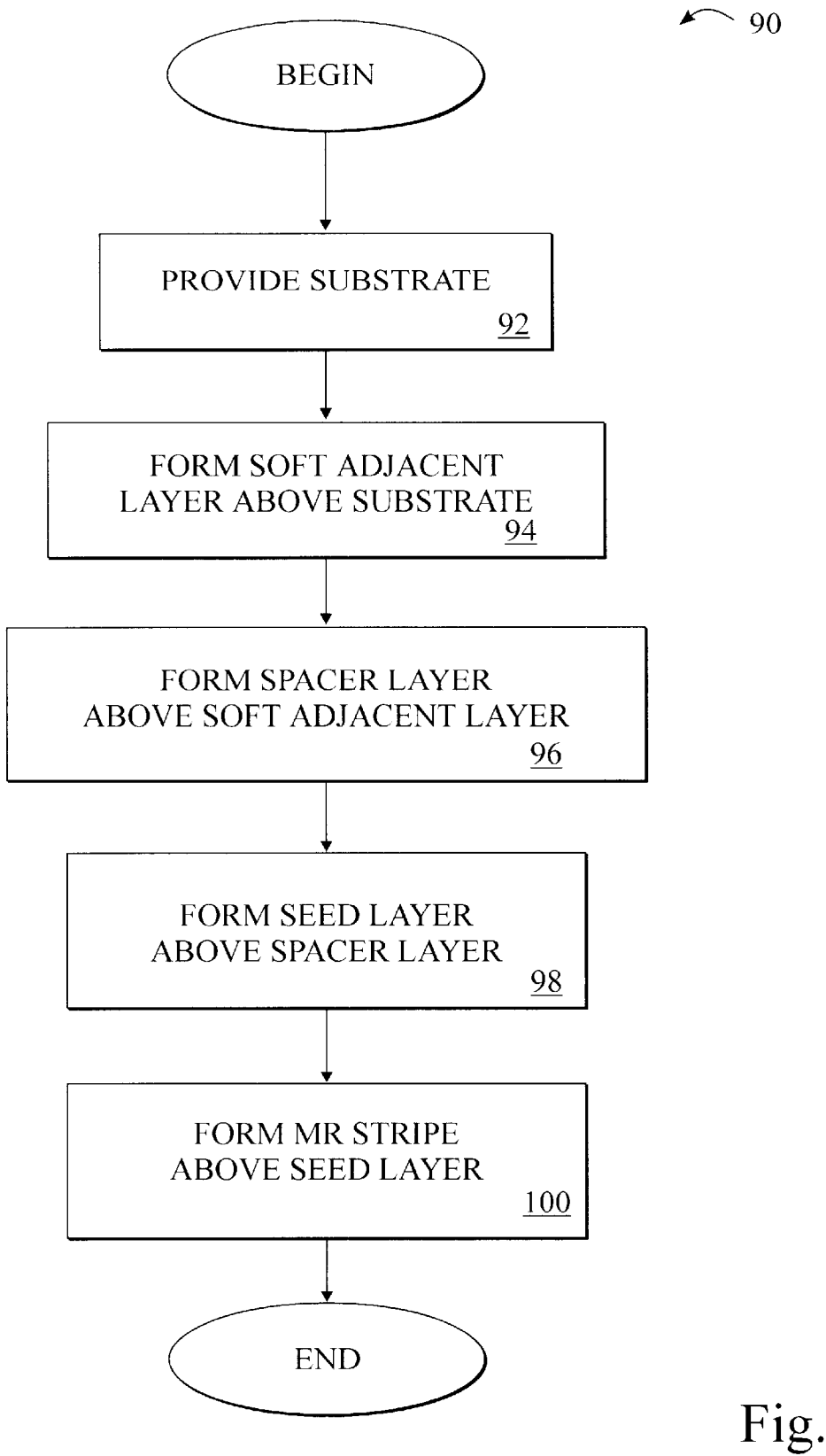
FIG. 7 is a process diagram of a method for forming a read sensor according to an embodiment of the present invention.

A process diagram is shown in FIG. 7 for a method 90 for forming a read sensor according to an embodiment of the present invention. In operation 92, a substrate is provided, above which a soft adjacent layer (SAL) is formed in operation 94. In operation 94, any suitable low-coercivity, high-permeability magnetic material can be used to form the soft adjacent layer. For example, a nickel-iron-rhodium (NiFeRh) material can be used. In operation 96, a spacer layer is form above the soft adjacent layer of operation 94. The spacer layer is formed of an electrically insulating material, such as tantalum or its alloys. The spacer layer can have a thickness of at least about 3 angstroms, while a thickness in the range of about 20 angstroms to about 35 angstroms works well. Above the spacer layer formed in operation 96, a seed layer is formed in operation 98. The seed layer is formed of nickel-iron-chromium (NiFeCr) and can have a thickness in the range of about 15 angstroms to about 45 angstroms. To provide a sensing layer, in operation 100 an MR stripe is formed above the seed layer of operation 98. It has been found that a read sensor formed with the method 90 described, exhibits a ΔR/R that is significantly greater than a read structure that is formed by a process that does not include formation of a spacer layer between the seed layer and soft adjacent layer, as in operation 96.

Figure 8:
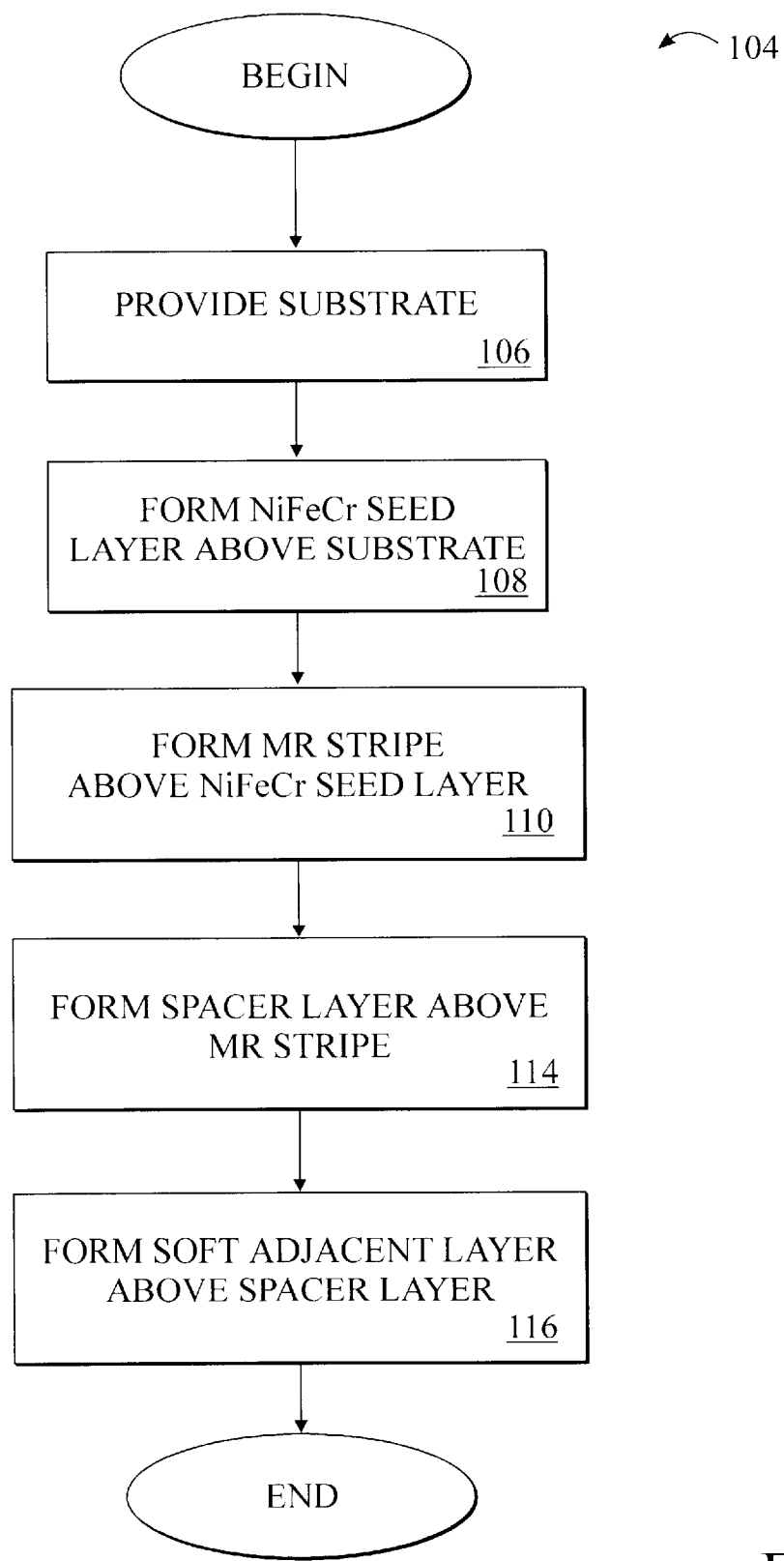
FIG. 8 is a process diagram of a method for forming a read sensor according to another embodiment of the present invention.

FIG. 8 depicts a process diagram of a method 104 for fabricating a read sensor according to another embodiment of the present invention. After providing a substrate in operation 106, a nickel-iron-chromium (NiFeCr) seed layer is formed above the substrate in operation 108. The seed layer can have a thickness in the range of about 15 angstroms to about 45 angstroms. In operation 110, an MR stripe is formed above the NiFeCr seed layer. In this way, the NiFeCr seed layer of operation 108 facilitates desired formation of the MR stripe in operation 110. Above the magnetoresistive stripe, a spacer layer is formed in operation 114. The spacer layer is formed of an electrically insulating material, such as tantalum or a tantalum alloy. Above the spacer layer formed in operation 114, a soft adjacent layer is formed in operation 116. The soft adjacent layer is formed of a low-coercivity, high-permeability magnetic material, such as nickel-iron-rhodium (NiFeRh). In this structure formed by method 104, the spacer layer of operation 114 provides electrical and magnetic insulation between the MR stripe and the soft adjacent layer formed in operation 116. With a read sensor structure formed by method 104, a significantly higher ΔR/R is exhibited than would be found with a read sensor formed by a method that does not include the operation 108 formation of the NiFeCr seed layer, and/or that includes the formation of a NiFeRh SAL adjacent to a NiFeCr layer.

In summary, the present invention provides structures and methods for providing an AMR read sensor that can exhibit a significantly higher ΔR/R, and therefore significantly higher read performance, than do previous AMR read sensors. The invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. For example, an electrically insulating material other than tantalum (Ta) can be used in the spacer layer between a NiFeCr layer and a SAL layer. The embodiments and preferred features described above should be considered exemplary, with the invention being defined by the appended claims, which therefore include all such alternatives, modifications, permutations and equivalents as fall within the true spirit and scope of the present invention.

What is claimed is:

1. A magnetic read element for use in magnetic data retrieval, comprising:
    a magnetoresistive stripe;
    a seed layer formed of NiFeCr and interfacially adjacent said magnetoresistive stripe;
    a spacer layer formed of an electrically insulating material, said seed layer being disposed between said magnetoresistive stripe and said spacer layer; and
    a soft adjacent layer formed of NiFeRh.

2. The magnetic read element as recited in claim 1, wherein said spacer layer is formed of one of the group consisting of Ta and Ta alloys.

3. The magnetic read element as recited in claim 2, wherein said soft adjacent layer is formed of CoNbTi.

4. The magnetic read element as recited in claim 2, wherein a thickness of said spacer layer is at least about 3 angstroms.

5. The magnetic read element as recited in claim 4, wherein said thickness of said spacer layer is in the range of about 20 angstroms to about 35 angstroms.

6. The magnetic read element as recited in claim 4, wherein a thickness of said seed layer is in the range of about 15 angstroms to about 45 angstroms.

7. The magnetic read element as recited in claim 1, further comprising a cap layer, wherein said magnetoresistive stripe is disposed between said cap layer and said seed layer.

8. The magnetic read element as recited in claim 1, wherein said cap layer is formed of one of the group consisting of Ta and NiFeCr.

9. A magnetic device for reading data from a magnetic medium, comprising:
    a first shield;
    a second shield disposed above said first shield; and
    a magnetic read sensor disposed between said first shield and said second shield, and including:
        a magnetoresistive stripe;
        a soft adjacent layer formed of NiFeRh;
        a seed layer formed of NiFeCr and disposed between said soft adjacent layer and said magnetoresistive stripe; and
        a spacer layer formed of an electrically insulating material and disposed between said seed layer and said soft adjacent layer.

10. The magnetic device as recited in claim 9, further comprising an inductive write element disposed above said magnetic read sensor.

11. The magnetic device as recited in claim 10, wherein said first shield, said second shield, said magnetic read sensor, and said write element are included in a read/write head, said magnetic device further comprising:
    a read/write head suspension system for facilitating placement of said read/write head in proximity to said magnetic medium; and
    a medium support for supporting said magnetic medium.

12. The magnetic read element as recited in claim 9, wherein said spacer layer is formed of one of the group consisting of Ta and Ta alloys.

13. The magnetic read element as recited in claim 12, wherein said thickness of said spacer layer is in the range of about 20 angstroms to about 35 angstroms.

14. The magnetic read element as recited in claim 12, wherein a thickness of said seed layer is in the range of about 15 angstroms to about 45 angstroms.

15. A method for forming a magnetic read sensor, comprising:

providing a substrate;

forming a soft adjacent layer of NiFeRh;

forming a spacer layer of electrically insulating material above said soft adjacent layer;

forming a seed layer of NiFeCr above said spacer layer; and forming a magnetoresistive stripe above and interfacially adjacent said seed layer.

16. The method for forming a magnetic read sensor as recited in claim 15, wherein said forming of said soft adjacent layer, said spacer layer, and said seed layer includes sputtering.

17. The method for forming a magnetic read sensor as recited in claim 15, wherein said spacer layer is formed of one of the group consisting of Ta and Ta alloys.

18. The method for forming a magnetic read sensor as recited in claim 17, wherein a thickness of said spacer layer is at least about 3 angstroms, and a thickness of said seed layer is in the range of about 15 angstroms to about 45 angstroms.

19. The method for forming a magnetic read sensor as recited in claim 17, further comprising forming a first shield below said substrate and forming a second shield above said magnetoresistive stripe.

20. A method for forming a magnetic read sensor, comprising:

providing a substrate;

forming a seed layer of NiFeCr above said substrate;

forming a magnetoresistive stripe above and interfacially adjacent said seed layer;

forming a spacer layer of one of the group consisting of Ta and Ta alloys above said magnetoresistive stripe; and forming a soft adjacent layer of low-coercivity, high-permeability magnetic material above said substrate.

21. The method for forming a magnetic read sensor as recited in claim 20, wherein said forming of said soft adjacent layer, said spacer layer, and said seed layer includes sputtering.

22. The method for forming a magnetic read sensor as recited in claim 20, wherein and said soft adjacent layer is formed of NiFeRh.

23. The method for forming a magnetic read sensor as recited in claim 22, wherein a thickness of said seed layer is in the range of about 15 angstroms to about 45 angstroms.

24. The method for forming a magnetic read sensor as recited in claim 22, further comprising forming a first shield below said seed layer and forming a second shield above said soft adjacent layer.

* * * * *